(12) United States Patent
Zhu

(10) Patent No.: US 11,599,139 B1
(45) Date of Patent: Mar. 7, 2023

(54) DYNAMIC ADJUSTMENT OF ROOT CLOCK FREQUENCY IN LOGIC SYSTEM DESIGN DURING VERIFICATION

(71) Applicant: XEPIC CORPORATION LIMITED, Nanjing (CN)

(72) Inventor: Jiahua Zhu, Hopkinton, MA (US)

(73) Assignee: XEPIC CORPORATION LIMITED, Nanjing (CN)

(*) Notice: Subject to any disclaimer, the term of this patent is extended or adjusted under 35 U.S.C. 154(b) by 0 days.

(21) Appl. No.: 17/466,201

(22) Filed: Sep. 3, 2021

(51) Int. Cl.
*G06F 1/08* (2006.01)
*G06F 1/10* (2006.01)

(52) U.S. Cl.
CPC . *G06F 1/08* (2013.01); *G06F 1/10* (2013.01)

(58) Field of Classification Search
CPC .............. G06F 1/12; G06F 1/08; G06F 1/10
See application file for complete search history.

(56) References Cited

U.S. PATENT DOCUMENTS

| | | | | | |
|---|---|---|---|---|---|
| 5,325,513 | A | * | 6/1994 | Tanaka | G06F 13/1694 710/16 |
| 8,261,218 | B1 | * | 9/2012 | Fung | G06F 30/34 716/108 |
| 2003/0217347 | A1 | * | 11/2003 | Meyer | G06F 30/30 716/114 |
| 2014/0181777 | A1 | * | 6/2014 | Cao | G06F 30/394 716/126 |
| 2015/0365082 | A1 | * | 12/2015 | Cooke | H03K 5/131 327/202 |
| 2016/0216727 | A1 | * | 7/2016 | Cooke | G06F 9/30014 |
| 2018/0096086 | A1 | | 4/2018 | Zompakis | |
| 2019/0187983 | A1 | * | 6/2019 | Ovsiannikov | G06F 9/3889 |
| 2021/0320664 | A1 | * | 10/2021 | Kavala | H03L 7/0816 |

FOREIGN PATENT DOCUMENTS

| | | |
|---|---|---|
| CN | 101765822 A | 6/2010 |
| CN | 207691782 U | 8/2018 |
| CN | 109906420 A | 6/2019 |
| CN | 112005497 A | 11/2020 |
| JP | 2014045508 A | 3/2014 |

* cited by examiner

*Primary Examiner* — Phil K Nguyen
(74) *Attorney, Agent, or Firm* — Anova Law Group, PLLC

(57) ABSTRACT

A method for dynamically adjusting a root clock frequency of a logic system design on an emulation system comprises: identifying a plurality of signal paths from one of a plurality of signal inputs of the logic system design to one of a plurality of signal outputs of the logic system design, each of the plurality of signal paths having a signal propagation delay; determining a state of an input signal to a target signal input in a current root clock cycle; determining a target signal path based on the state of the target signal input in the current root clock cycle and one or more logic devices along each signal path associated with the target signal input; and determining the root clock frequency based on a longest signal propagation delay of the signal propagation delays of the plurality of signal paths excluding the target signal path.

19 Claims, 5 Drawing Sheets

| Path | Propagation Time |
|---|---|
| a → U | 10+40+2+3+80+5=140ns |
| a → V | 10+40+2+3+2+40+5=102ns |
| b → U | 5+20+3+2+30+2+3+80+5=150ns |
| b → V | 5+20+3+2+30+2+3+2+40+5=112ns |
| c → U | 5+80+2+2+30+2+3+80+5=209ns |
| c → V | 5+80+2+2+30+2+3+2+40+5=171ns |
| d → V | 10+30+2+2+40+5=89ns |
| d → W | 10+20+5=35ns |

FIG. 3

| Path | Propagation Time |
|---|---|
| a→U | 10+40+2+3+80+5=140ns |
| a→V | 10+40+2+3+2+40+5=102ns |
| b→U | 5+20+3+2+30+2+3+80+5=150ns |
| b→V | 5+20+3+2+30+2+3+2+40+5=112ns |
| ~~c→U~~ | ~~5+80+2+2+30+2+3+80+5=209ns~~ |
| ~~c→V~~ | ~~5+80+2+2+30+2+3+2+40+5=171ns~~ |
| d→V | 10+30+2+2+40+5=89ns |
| d→W | 10+20+5=35ns |

FIG. 4

| Path | Propagation Time |
|---|---|
| a →U | 10+40+2+3+80+5=140ns |
| a →V | 10+40+2+3+2+40+5=102ns |
| b →U | 5+20+3+2+30+2+3+80+5=150ns |
| b →V | 5+20+3+2+30+2+3+2+40+5=112ns |
| c →U | 5+80+2+2+30+2+3+80+5=209ns |
| c →V | 5+80+2+2+30+2+3+2+40+5=171ns |
| d →V | 10+30+2+2+40+5=89ns |
| d →W | 10+20+5=35ns |

DYNAMIC ADJUSTMENT OF ROOT CLOCK FREQUENCY IN LOGIC SYSTEM DESIGN DURING VERIFICATION

TECHNICAL FIELD

The present disclosure relates to the technical field of integrated circuit (IC) chip design verification and, more particularly, to a method and an apparatus of dynamically adjusting a root clock frequency in the logic system design during verification.

BACKGROUND

In an IC chip design process, the IC chip design is often verified by running hardware description codes of the IC chip on a plurality of field programmable gate arrays (FPGAs) to emulate the IC chip. In the emulation, the plurality of FPGAs are synchronized by a root clock. Generally, a root clock frequency is determined by the longest path of all paths that a signal may propagate from any input to any output. Because the emulation process may take many clock cycles to complete, dynamically adjusting the root clock frequency to be higher than the clock frequency determined by the longest path may substantially reduce the duration of the emulation process.

SUMMARY

In accordance with the disclosure, there is provided a method for dynamically adjusting a root clock frequency of a logic system design on an emulation system. The method includes: identifying a plurality of signal paths from one of a plurality of signal inputs of the logic system design to one of a plurality of signal outputs of the logic system design, each of the plurality of signal paths having a signal propagation delay; determining a state of an input signal to a target signal input in a current root clock cycle using a check logic placed at the target signal input; determining a target signal path from the plurality of signal paths in the current root clock cycle based on the state of the input signal to the target signal input in the current root clock cycle and one or more logic devices along each signal path associated with the target signal input; and determining the root clock frequency for the logic system design based on a longest signal propagation delay of the signal propagation delays of the plurality of signal paths excluding the target signal path.

Also in accordance with the disclosure, there is provided an apparatus for dynamically adjusting a root clock frequency of a logic system design on an emulation system. The apparatus includes a memory storing program instructions and a processor configured to execute the program instructions to: identify a plurality of signal paths from one of a plurality of signal inputs of the logic system design to one of a plurality of signal outputs of the logic system design, each of the plurality of signal paths having a signal propagation delay; determine a state of an input signal to a target signal input in a current root clock cycle using a check logic placed at the target signal input; determine a target signal path from the plurality of signal paths in the current root clock cycle based on the state of the input signal to the target signal input in the current root clock cycle and one or more logic devices along each signal path associated with the target signal input; and determine the root clock frequency for the logic system design based on a longest signal propagation delay of the signal propagation delays of the plurality of signal paths excluding the target signal path.

Also in accordance with the disclosure, there is provided a non-transitory computer readable medium that stores a set of instructions that is executable by at least one processor of an electronic system to cause the electronic system to perform a method for dynamically adjusting a root clock frequency of a logic system design on an emulation system. The method comprises: identifying a plurality of signal paths from one of a plurality of signal inputs of the logic system design to one of a plurality of signal outputs of the logic system design, each of the plurality of signal paths having a signal propagation delay; determining a state of an input signal to a target signal input in a current root clock cycle using a check logic placed at the target signal input; determining a target signal path from the plurality of signal paths in the current root clock cycle based on the state of the input signal to the target signal input in the current root clock cycle and one or more logic devices along each signal path associated with the target signal input; and determining the root clock frequency for the logic system design based on a longest signal propagation delay of the signal propagation delays of the plurality of signal paths excluding the target signal path.

BRIEF DESCRIPTION OF THE DRAWINGS

FIG. 3 shows an exemplary complete list of signal paths of the plurality of FPGAs shown in FIG. 2.

FIG. 4 shows exemplary results of excluding target signal paths having one signal input in an unchanging state, according to some embodiments of the present disclosure.

DETAILED DESCRIPTION OF THE EMBODIMENTS

Figure 1:
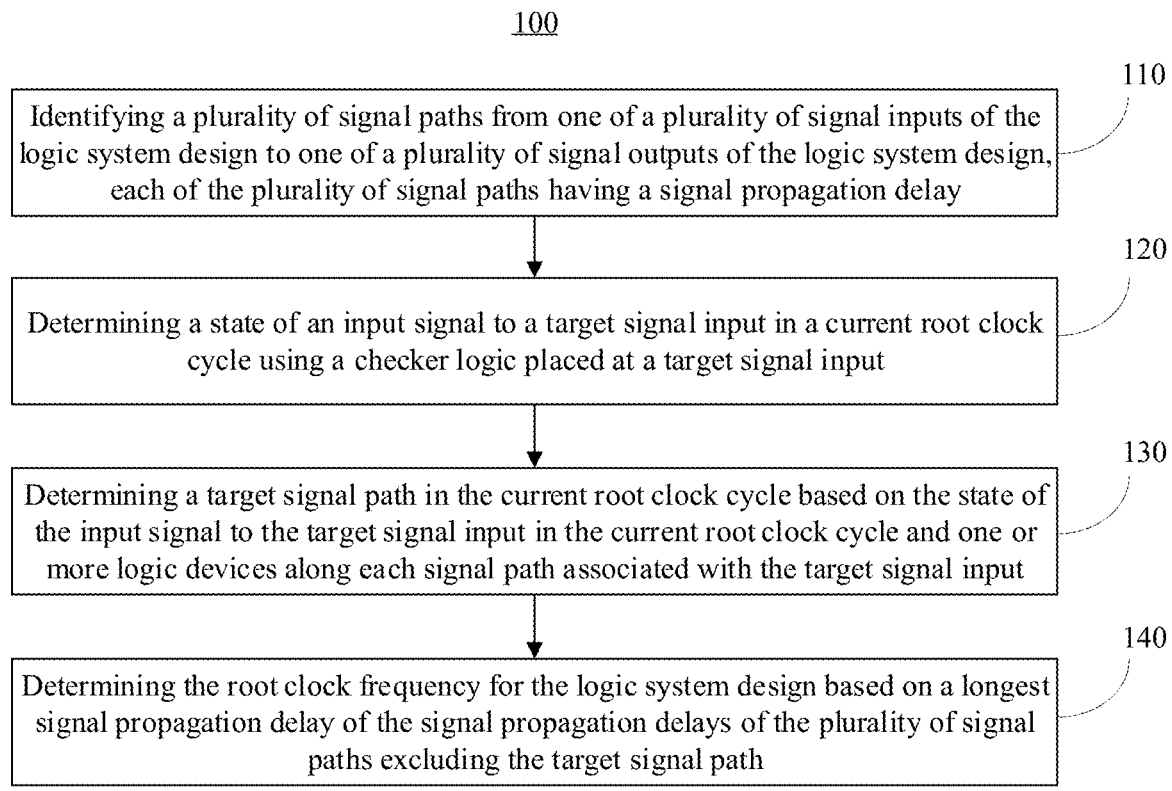
FIG. 1 illustrates a flow chart of an exemplary method of dynamically adjusting a root clock frequency in chip design verification, according to some embodiments of the present disclosure.

Embodiments of the present disclosure are described in detail below with reference to the accompanying drawings. Same or similar reference numerals in the drawings represent the same or similar elements having the same or similar functions throughout the specification. The described embodiments are some rather than all of the embodiments of the present disclosure. Other embodiments obtained by those having ordinary skills in the art on the basis of the described embodiments without inventive efforts should fall within the scope of the present disclosure. Unless there is conflict, the following embodiments and features of the embodiments can be combined with each other.

A logic system design (e.g., an integrated circuit (IC) chip) often needs to be verified before being finalized for production. The verification of the logic system design can be achieved by emulating the logic system design using a plurality of field programmable gate arrays (FPGAs). The emulation of the logic system design can include compiling the hardware description language (HDL) codes of the logic system design into a gate-level netlist and implementing the gate-level netlist on the plurality of FPGAs configured to mimic the logic system design. By running the emulated logic design system on the FPGAs, waveforms of the logic design system can be generated for further verification.

Due to the limited number of gates that can be provided by one FPGA, each of the plurality of FPGAs merely emulates one or more components of the logic system design. The plurality of FPGAs can be connected to emulate the entire logic system design in hardware. Signal transmissions among the plurality of FPGAs are synchronized according to a root clock of the emulated logic design system. An input signal at a signal input of the emulated logic design system may need to propagate through the plurality of FPGAs to reach an intended signal output within a root clock cycle, so that states of each emulated components across the PFGAs can be synchronized.

Generally, the emulated logic design system includes multiple signal inputs and multiple signal outputs. A path along which the input signal propagates from one signal input to one signal output is called a signal path. Each of the plurality of FPGAs includes at least one logic device such as a flip-flop, a logic gate, a register, and the like. A propagation delay occurs when a signal propagates through the logic device. The propagation delay also occurs when the signal propagates through a wire connecting two logic devices. The propagation delay of the signal path can be calculated by adding up the propagation delays of the logic devices and the wires along the signal path.

The emulated logic design system often includes multiple signal paths having different propagation delays. To ensure that the input signal propagates through all signal paths within the root clock cycle, the root clock cycle needs to be greater than or equal to the propagation delay of the longest signal path among all the signal paths of the emulated logic design system. The longest signal path is called a critical path. Thus, the propagation delay of the critical path determines the root clock frequency.

In some embodiments, during compiling, the hardware description language (HDL) codes of the logic system design can be compiled and the propagation delays of all the signal paths can be calculated. The root clock frequency can be determined by inverting the propagation delay of the critical path. During emulation, the root clock is used to synchronize the plurality of FPGAs in the emulation system. The root clock remains constant during the entire emulation.

Conventionally, the root clock frequency can be determined according to the propagation delay of the critical path. As the propagation delay of the critical path is the longest one among the plurality of signal paths, the root clock frequency is set to be the lowest accordingly, causing the emulation to be very time consuming.

Under certain circumstances, a certain input signal at the signal input may remain unchanged in a current root clock cycle. In other words, the certain input signal does not propagate through the emulation system from the signal input to one or more signal outputs. That is, the signal paths from the signal input to the one or more signal outputs for the certain input signal do not carry changing signals in the current root clock cycle. Therefore, consistent with the present disclosure, such signal paths are excluded from the signal paths that are used to determine the root clock frequency in the current root clock cycle, and only the signal paths that carry changing signals in the current root clock cycle are used to determine the root clock frequency. Excluding the signal paths that carry unchanged signals does not affect the verification of the functionality of the logic system design.

During compiling, the HDL codes can be compiled into a gate-level netlist to be implemented on the plurality of FPGAs. In some embodiments, the propagation delays of all the signal paths are calculated while the codes are being compiled. When the calculated propagation delay of a signal path is greater than or equal to a target delay threshold, the signal input of the signal path can be determined to be a target signal input. Depending on the target delay threshold, one or more target signal inputs can be determined. In practical applications, the target delay threshold can be selected such that a sufficient number of signal inputs associated with signal paths having long propagation delays can be determined to be the target signal inputs. In some embodiments, the target delay threshold can be determined such that a ratio of the number of the target signal inputs to the number of all the signal inputs of the emulation system is greater than or equal to a target percentage. In some embodiments, the target percentage can be in a range from 20%-90%, such as 50%.

After the target signal inputs are determined, a check logic can be placed at each of the target signal inputs to determine a state of an input signal to the target signal input in the current root clock cycle. The state of the target signal input can include that the input signal at the target signal input is 0 or 1, and/or the input signal remains unchanged or is changed in the current root clock cycle. The state in which the input signal is 0 is also referred to as a "0 state," and the state in which the input signal is 1 is also referred to as a "1 state." Further, the state in which the input signal remains unchanged is also referred to as an "unchanging state," and the state in which the input signal is changed is also referred to as a "changing state." Then, the signal paths associated with the target signal inputs having the unchanging state can be identified. In some cases, the output signal at the signal output of the signal path may still change even if the corresponding target signal input is in the unchanging state. It is appreciated that even the output signal at the signal output of a signal path changes, the changing state is not caused by the input signal of the signal path which remains unchanged. That is, the input signal of the signal path has no influence over the changing state of the output signal at the signal output. And therefore, the delay caused by the input signal that remains unchanged can be neglected.

In some embodiments, a target signal path may be determined in the current root clock cycle based on the state of the target signal input in the current root clock cycle and the one or more logic devices along each signal path associated with the target signal input. As an example, whether the target signal input is in the unchanging state in the current root clock cycle can be determined first. In response to the target signal input being in the unchanging state in the current clock cycle, whether the output signal of the signal output of the signal path associated with the target signal input remains unchanged can be determined based on the one or more logic devices along the signal path. In response to the output signal remaining unchanged, the signal path can be determined to be the target signal path.

In some embodiments, whether the target signal input is in the 0 state or the 1 state in the current root clock cycle can be determined first. In response to the target signal input being in the 0 state or the 1 state in the current clock cycle, whether the output signal of the signal output of the signal path associated with the target signal input remains unchanged is determined based on the one or more logic devices along the signal path. In response to the output signal remaining unchanged, the signal path is determined to be the target signal path.

Whether the output signal at the signal output of the signal path changes or not may be determined by tracing the logic devices along the signal path. For example, when one of the signal inputs of an AND gate logic device is 0 in the current root clock cycle, the signal output of the AND gate logic device is 0 in the current root clock cycle. As another example, when one of the signal inputs of an OR gate logic device is 1 in the current root clock cycle, the signal output of the OR gate logic device is 1 in the current root clock cycle.

During emulation, the root clock frequency is dynamically determined for the current root clock cycle. The target signal path is excluded from determining the root clock frequency. Depending on the actual logic system design, one or more target signal paths may be excluded from being used to determine the root frequency. Because the target signal paths often have relatively long propagation delays, after the target signal paths are excluded, the longest propagation delay of the remaining signal paths of the emulation system is often shorter as compared to the propagation delay of the critical path determined during the compiling stage. Thus, the root clock frequency can be increased and the emulation process can be less time consuming.

FIG. 1 illustrates a flow chart of an exemplary method 100 of dynamically adjusting a root clock frequency in chip design verification according to some embodiments of the present disclosure. The method of dynamically adjusting a root clock frequency in chip design verification is also referred to as a "dynamic frequency adjustment method," a "dynamic adjustment method," or an "adjustment method."

As shown in FIG. 1, at 110, a plurality of signal paths from one of a plurality of signal inputs of the logic system design to one of a plurality of signal outputs of the logic system design are identified, each of the plurality of signal paths having a signal propagation delay.

A signal path is a path that a signal propagates from a signal input to a signal output. When the signal propagates through a logic device or a wire connecting logic devices, a signal propagation delay may occur. The signal propagation delay for the signal path includes the signal delays of the logic devices and the wires along the signal path. The signal path having the longest signal propagation delay is called the critical path. The signal propagation delay of the critical path usually determines the root clock frequency.

Figure 2:
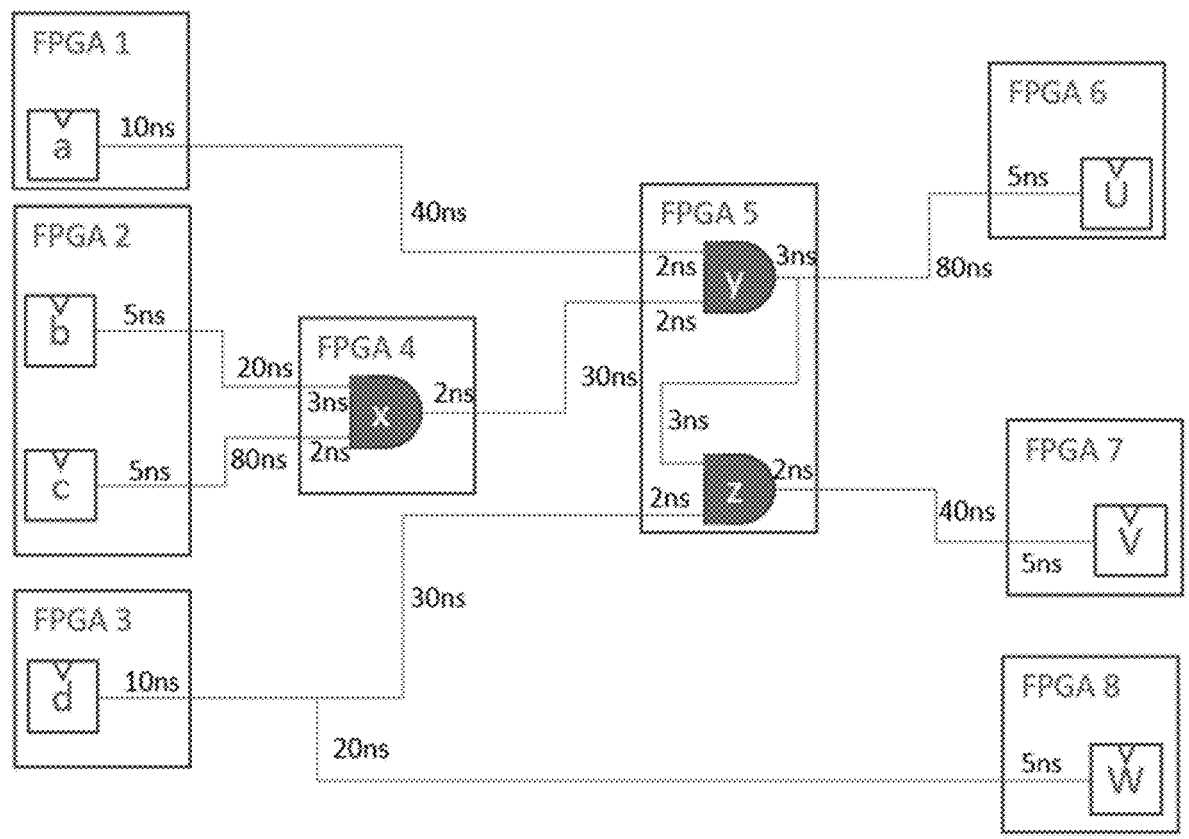
FIG. 2 is a schematic diagram showing the emulation of a logic system design using a plurality of field programmable gate arrays (FPGAs), according to some embodiments of the present disclosure.

FIG. 2 is a schematic diagram showing the emulation of a logic system design using a plurality of field programmable gate arrays (FPGAs), according to some embodiments of the present disclosure. A system including the plurality of FPGAs configured to emulate an logic system design is also referred to as an "emulation system." As an example, the logic system design shown in FIG. 2 includes four signal inputs, a, b, c, and d, three signal outputs, U, V, and W, and eight FPGAs, FPGA 1 through FPGA 8. FPGA 4 includes an AND gate x. FPGA 5 includes two AND gates y and z. The signal propagation delays of the logic devices and the wires are labeled in FIG. 2.

During compiling, the signal propagation delays can be calculated for all the signal paths, and the results for the example system in FIG. 2 are shown in FIG. 3. The longest signal path is from signal input d to signal output W, with a signal propagation delay of 209 ns. As such, the root clock frequency is about 4.7 MHz.

Referring again to FIG. 1, at 120, a state of an input signal to a target signal input in a current root clock cycle can be determined using a check logic placed at the target signal input.

The target signal input can be selected from all the signal inputs associated with the signal paths having relatively long signal propagation delays. In some embodiments, the target signal input can be any input of the logic system design. The check logic can be configured to determine the state of the target signal input, which includes 0, 1, unchanging, and/or changing. The 0 state of the signal input corresponds to the input signal equaling to 0 at the signal input in the current root clock cycle. The 1 state of the signal input corresponds to the input signal equaling to 1 at the signal input in the current root clock cycle. The unchanging state of the signal input corresponds to the input signal being the same at the signal input in the current root clock cycle. The changing state of the signal input corresponds to the input signal being toggled at the signal input in the current root clock cycle.

In some embodiments, the check logic is an XOR gate. The input signal in the current root clock cycle can be XORed with an input signal in a preceding root clock cycle. If they are different, the output of the XOR gate is 1. If they are the same, the output of the XOR gate is 0. Thus, the check logic is able to determine whether the signal input is in the unchanging state or in the changing state.

At 130, a target signal path can be determined in the current root clock cycle based on the state of the input signal to the target signal input in the current root clock cycle and one or more logic devices along each signal path associated with the target signal input.

After the state of the target signal input is determined in the current root clock cycle, the target signal path can be determined based on the state of the target signal input. As an example, whether the target signal input is in the unchanging state in the current root clock cycle can be determined first. In response to the target signal input being in the unchanging state in the current clock cycle, a signal path originating from the target signal input can be determined to be the target signal path.

In some embodiments, whether the target signal input is in the 0 state or the 1 state in the current root clock cycle can be determined. In response to the target signal input being in the 0 state or the 1 state in the current clock cycle, whether the output signal of the signal output of the signal path associated with the target signal input remains unchanged can be determined based on the one or more logic devices along the signal path. In response to the output signal remaining unchanged, the signal path is determined to be the target signal path.

In some embodiments, whether the output signal at the signal output of the signal path changes or not can be determined by tracing the logic devices along the signal path. For example, when one of the signal inputs of an AND gate logic device is 0 in the current root clock cycle, the signal output of the AND gate logic device is 0 in the current root clock cycle. In another example, when one of the signal inputs of an OR gate logic device is 1 in the current root clock cycle, the signal output of the OR gate logic device is 1 in the current root clock cycle. That is, in response to the target signal input being in the 0 state, the target signal path can consist of a number of consecutive AND gates. Similarly, in response to the target signal input being in the 1 state, the target signal path can consist of a number of consecutive OR gates.

At 140, the root clock frequency for the logic system design can be determined based on a longest signal propagation delay of the signal propagation delays of the plurality of signal paths excluding the target signal path.

During emulation, the root clock frequency can be dynamically determined for the current root clock cycle. The target signal path can be excluded from the signal paths used for determining the root clock frequency. The remaining signal paths can be referred to as working signal paths. Depending on the actual logic system design, one or more target signal paths can be excluded from being used for determining the root frequency. Because the target signal paths often have relatively long propagation delays, after the target signal paths are excluded, the longest propagation delay of the remaining signal paths of the emulation system is often shorter as compared to the propagation delay of the critical path determined during the compiling stage. Thus, the root clock frequency can be increased and the emulation process can be less time consuming.

FIG. 4 shows the example results of excluding target signal paths having one signal input in the unchanging state for the emulation system shown in FIG. 2 according to some embodiments of the present disclosure. In this case, signal input c is in the unchanging state. In other words, flip-flop c of FPGA 2 stays at an old value.

Referring again to FIG. 2, one signal path starts from signal input c and propagates through flip-flop c (with a delay of 5 ns), the wire connecting the flip-flop c and the AND gate x (with a delay of 80 ns), AND gate x (with a delay of 2 ns+2 ns=4 ns), the wire connecting AND gate x and AND gate y (with a delay of 30 nm), AND gate y (with a delay of 2 ns+3 ns=5 ns), the wire connecting AND gate y and flip-flop U (with a delay of 80 ns), and flip-flop U (with a delay of 5 ns), thereby accumulating 209 ns signal propagation delay. Similarly, another signal path starts from signal input c and propagates through flip-flop c (with a delay of 5 ns), the wire connecting flip-flop c and AND gate x (with a delay of 80 ns), AND gate x (with a delay of 2 ns+2 ns=4 ns), the wire connecting AND gate x and AND gate y (with a delay of 30 ns), AND gate y (with a delay of 2 ns+3 ns=5 ns), the internal wire connecting AND gate y and AND gate z (with a delay of 0 ns), AND gate z (with a delay of 3 ns+2 ns=5 ns), the wire connecting AND gate z and flip-flop V (with a delay of 40 ns), and flip-flop V (with a delay of 5 ns), thereby accumulating 171 ns signal propagation delay. These two signal paths happen to be the longest signal path (209 ns) and the second longest signal path (171 ns), respectively. These two signal paths are determined to be the target signal paths and are excluded from being used for determining the root clock frequency for the current root clock cycle.

As shown in FIG. 4, after the target signal paths are excluded, the longest signal path is the signal path from signal input b to signal output U, which has a signal propagation delay of 150 ns. Thus, the root clock frequency is determined to be about 6.67 MHz (i.e., 1/150 ns). Compared with the root clock frequency determined without excluding the target signal paths (i.e., 4.7 MHz), the root clock frequency for the current root clock cycle is increased by a factor of 1.42.

Figures 5, 6:
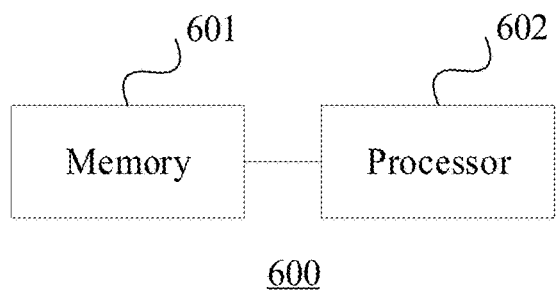
FIG. 5 shows exemplary results of excluding target signal paths having one of three signal inputs in a 0 state, according to some embodiments of the present disclosure.
FIG. 6 shows an exemplary apparatus of dynamically adjusting a root clock frequency in chip design verification, according to some embodiments of the present disclosure.

FIG. 5 illustrates exemplary results of excluding the target signal paths having one of the three signal inputs in the 0 state for the emulation system shown in FIG. 2 according to some embodiments of the present disclosure. In this case, one of signal input a, signal input b, and signal input c is in the 0 state. In other words, one of flip-flop a of FPGA 1, flip-flop b and flip-flop c of FPGA 2 outputs 0 in the current root clock cycle.

Referring again to FIG. 2, the signal paths that start from one of signal input a, signal input b, and signal input c can be determined to be target signal paths similarly. For example, signal input a is in the 0 state. Two signal paths starting from signal input a to signal output U and signal output V are the target signal paths because flip-flop a outputs 0, which in turn forces both AND gate y and AND gate z to output 0 and further forces both flip-flop U and flip-flop V to output 0. On the other hand, because both AND gate y and AND gate z output 0 and force both flip-flop U and flip-flop V to output 0, the signal paths starting from signal input b to signal output U and signal output V, the signal paths starting from signal input c to signal output U and signal output V, and the signal path starting from signal input d to signal output V do not carry a changing signal (e.g., the input signal and the output signal of the signal path are both 0) and are determined to be the target signal paths. Similarly, when signal input b or signal input c is in the 0 state, the same seven signal paths are the target signal paths. The target signal paths are excluded from being used for determining the root clock frequency for the current root clock cycle. Therefore, in response to the target signal input being in the 0 state, the target signal path can consist of a number of consecutive AND gates. Similarly, in response to the target signal input being in the 1 state, the target signal path can consist of a number of consecutive OR gates.

As shown in FIG. 5, after the target signal paths are excluded, only one signal path from signal input d to signal output W remains, which has a signal propagation delay of 35 ns. Thus, the root clock frequency is determined to be about 28.6 MHz. Compared with the original root clock frequency determined without excluding the target signal paths (i.e., 4.7 MHz), the root clock frequency for the current root clock cycle is 6.1 times of the original root clock frequency.

The present disclosure also provides an apparatus of dynamically adjusting a root clock frequency in the logic system design verification, which is also referred to as an "dynamic frequency adjustment apparatus," "dynamic adjustment apparatus," or "adjustment apparatus." FIG. 6 illustrates an exemplary dynamic frequency adjustment apparatus 600 according to some embodiments of the present disclosure. As shown in FIG. 6, the apparatus 600, as an example of an electronic system, includes a memory 601 storing program instructions and a processor 602 configured to execute the program instructions to: identify a plurality of signal paths from one of a plurality of signal inputs of the logic system design to one of a plurality of signal outputs of the logic system design, each of the plurality of signal paths having a signal propagation delay; determine a state of an input signal to a target signal input in a current root clock cycle using a check logic placed at the target signal input; determine a target signal path from the plurality of signal paths in the current root clock cycle based on the state of the input signal to the target signal input in the current root clock cycle and one or more logic devices along each signal path associated with the target signal input; and determine the root clock frequency for the logic system design based on a longest signal propagation delay of the signal propagation delays of the plurality of signal paths excluding the target signal path.

In some embodiments, a signal propagation delay of a signal path is determined during compilation of the logic system design by adding up signal propagation delays of logic devices along the signal path and one or more wires each connecting two of the logic devices.

In some embodiments, the target signal input is a signal input associated with a signal path having a signal propagation delay longer than a target delay threshold.

In some embodiments, the target delay threshold is set such that a ratio of a number of the one or more target signal inputs to a number of the plurality of signal inputs is greater than or equal to a target percentage.

In some embodiments, the state of the target signal input includes a 0 state in which the input signal is 0 in the current root clock cycle, a 1 state in which the input signal is 1 in the current root clock cycle, an unchanging state in which the input signal is unchanged in the current root clock cycle, or a changing state in which the input signal is changed in the current root clock cycle.

In some embodiments, the processor 602 is further configured to: determine whether the target signal input is in the unchanging state in the current root clock cycle; and in response to the target signal input being in the unchanging state in the current clock cycle, determine a signal path originating from the target signal input to be the target signal path.

In some embodiments, the processor 602 is further configured to: determine whether the target signal input is in the 0 state or the 1 state in the current root clock cycle; in response to the target signal input being in the 0 state or the 1 state in the current clock cycle, determine whether an output signal of the signal output of each signal path associated with the target signal input remains unchanged based on the one or more logic devices along the signal path; and in response to the output signal remaining unchanged, determine the signal path to be the target signal path.

In some embodiments, the processor 602 is further configured to: determine whether the target signal input is in the 0 state or the 1 state in the current root clock cycle; in response to the target signal input being in the 0 state and a signal path associated with the target signal input including a plurality of cascaded AND gates, determine the signal path to be the target signal path; and in response to the target signal input being in the 1 state and a signal path associated with the target signal input including a plurality of cascaded OR gates, determine the signal path to be the target signal path.

In some embodiments, a look-up table storing relationships between root clock frequencies for the logic system design and the plurality of signal paths is generated during the compilation based on signal propagation delays of the plurality of signal paths, and is used to determine the root clock frequency for the logic system design based on the signal path corresponding to the longest signal propagation delay of the signal propagation delays of the plurality of signal paths excluding the target signal path.

A person of ordinary skill in the art may understand that all or part of the processes in the above described method embodiments may be implemented by instructing relevant hardware (e.g., an electronic system) through a computer program. The computer program may be stored in a non-transitory computer-readable storage medium. When being executed, the computer program may include the processes of the above-described method embodiments. The non-transitory computer-readable storage medium may be a magnetic disk, an optical disk, a read-only memory (ROM), or a random-access memory (RAM).

The above disclosed are only some of the embodiments of the present disclosure, which of course may not be used to limit the scope of the present disclosure. Therefore, equivalent changes made according to the embodiments of the present disclosure still fall within the scope of the present disclosure.

What is claimed is:

1. A method for dynamically adjusting a root clock frequency of a logic system design on an emulation system, comprising:
   identifying a plurality of signal paths from one of a plurality of signal inputs of the logic system design to one of a plurality of signal outputs of the logic system design, each of the plurality of signal paths having a signal propagation delay;
   determining a state of an input signal to a target signal input in a current root clock cycle using a check logic placed at the target signal input;
   determining a target signal path from the plurality of signal paths in the current root clock cycle based on the state of the input signal to the target signal input in the current root clock cycle and one or more logic devices along each signal path associated with the target signal input; and
   determining the root clock frequency for the logic system design based on a longest signal propagation delay of the signal propagation delays of the plurality of signal paths excluding the target signal path;
   controlling, according to the determined root clock frequency, an emulation process of the logic system design on the emulation system.

2. The method of claim 1, wherein:
   a signal propagation delay of a signal path is determined during compilation of the logic system design by adding up signal propagation delays of logic devices along the signal path and one or more wires each connecting two of the logic devices.

3. The method of claim 1, wherein:
   the target signal input is a signal input associated with a signal path having a signal propagation delay longer than a target delay threshold.

4. The method of claim 3, wherein:
   the target delay threshold is set such that a ratio of a number of the one or more target signal inputs to a number of the plurality of signal inputs is greater than or equal to a target percentage.

5. The method of claim 1, wherein:
   the state of the target signal input includes a 0 state in which the input signal is 0 in the current root clock cycle, a 1 state in which the input signal is 1 in the current root clock cycle, an unchanging state in which the input signal is unchanged in the current root clock cycle, or a changing state in which the input signal is changed in the current root clock cycle.

6. The method of claim 5, wherein determining the target signal path from the plurality of signal paths in the current root clock cycle comprises: determining whether the target signal input is in the unchanging state in the current root clock cycle; and in response to the target signal input being in the unchanging state in the current clock cycle, determining a signal path originating from the target signal input to be the target signal path.

7. The method of claim 5, wherein determining the target signal path from the plurality of signal paths in the current root clock cycle comprises: determining whether the target signal input is in the 0 state or the 1 state in the current root clock cycle;
   in response to the target signal input being in the 0 state or the 1 state in the current clock cycle, determining whether an output signal of the signal output of each signal path associated with the target signal input remains unchanged based on the one or more logic devices along the signal path; and in response to the output signal remaining unchanged, determining the signal path to be the target signal path.

8. The method of claim 5, wherein determining the target signal path from the plurality of signal paths in the current root clock cycle comprises:

determining whether the target signal input is in the 0 state or the 1 state in the current root clock cycle;

in response to the target signal input being in the 0 state and a signal path associated with the target signal input including a plurality of cascaded AND gates, determining the signal path to be the target signal path; and in response to the target signal input being in the 1 state and a signal path associated with the target signal input including a plurality of cascaded OR gates, determining the signal path to be the target signal path.

9. The method of claim 2, wherein:

a look-up table storing relationships between root clock frequencies for the logic system design and the plurality of signal paths is generated during the compilation based on signal propagation delays of the plurality of signal paths, and is used to determine the root clock frequency for the logic system design based on the signal path corresponding to the longest signal propagation delay of the signal propagation delays of the plurality of signal paths excluding the target signal path.

10. An apparatus for dynamically adjusting a root clock frequency of a logic system design, comprising:

a memory storing program instructions; and a processor configured to execute the program instructions to:

identify a plurality of signal paths from one of a plurality of signal inputs of the logic system design to one of a plurality of signal outputs of the logic system design, each of the plurality of signal paths having a signal propagation delay;

determine a state of an input signal to a target signal input in a current root clock cycle using a check logic placed at the target signal input;

determine a target signal path from the plurality of signal paths in the current root clock cycle based on the state of the input signal to the target signal input in the current root clock cycle and one or more logic devices along each signal path associated with the target signal input; and determine the root clock frequency for the logic system design based on a longest signal propagation delay of the signal propagation delays of the plurality of signal paths excluding the target signal path;

controlling, according to the determined root clock frequency, an emulation process of the logic system design on the emulation system.

11. The apparatus of claim 10, wherein: a signal propagation delay of a signal path is determined during compilation of the logic system design by adding up signal propagation delays of logic devices along the signal path and one or more wires each connecting two of the logic devices.

12. The apparatus of claim 10, wherein: the target signal input is a signal input associated with a signal path having a signal propagation delay longer than a target delay threshold.

13. The apparatus of claim 12, wherein: the target delay threshold is set such that a ratio of a number of the one or more target signal inputs to a number of the plurality of signal inputs is greater than or equal to a target percentage.

14. The apparatus of claim 10, wherein: the state of the target signal input includes a 0 state in which the input signal is 0 in the current root clock cycle, a 1 state in which the input signal is 1 in the current root clock cycle, an unchanging state in which the input signal is unchanged in the current root clock cycle, or a changing state in which the input signal is changed in the current root clock cycle.

15. The apparatus of claim 14, wherein the processor is further configured to:

determine whether the target signal input is in the unchanging state in the current root clock cycle; and in response to the target signal input being in the unchanging state in the current clock cycle, determine a signal path originating from the target signal input to be the target signal path.

16. The apparatus of claim 14, wherein the processor is further configured to:

determine whether the target signal input is in the 0 state or the 1 state in the current root clock cycle;

in response to the target signal input being in the 0 state or the 1 state in the current clock cycle, determine whether an output signal of the signal output of each signal path associated with the target signal input remains unchanged based on the one or more logic devices along the signal path; and in response to the output signal remaining unchanged, determine the signal path to be the target signal path.

17. The apparatus of claim 14, wherein the processor is further configured to:

determine whether the target signal input is in the 0 state or the 1 state in the current root clock cycle; in response to the target signal input being in the 0 state and a signal path associated with the target signal input including a plurality of cascaded AND gates, determine the signal path to be the target signal path; and in response to the target signal input being in the 1 state and a signal path associated with the target signal input including a plurality of cascaded OR gates, determine the signal path to be the target signal path.

18. The apparatus of claim 11, wherein:

a look-up table storing relationships between root clock frequencies for the logic system design and the plurality of signal paths is generated during the compilation based on signal propagation delays of the plurality of signal paths, and is used to determine the root clock frequency for the logic system design based on the signal path corresponding to the longest signal propagation delay of the signal propagation delays of the plurality of signal paths excluding the target signal path.

19. A non-transitory computer readable medium that stores a set of instructions that is executable by at least one processor of an electronic system to cause the electronic system to perform a method for dynamically adjusting a root clock frequency of a logic system design on an emulation system, the method comprising:

identifying a plurality of signal paths from one of a plurality of signal inputs of the logic system design to one of a plurality of signal outputs of the logic system design, each of the plurality of signal paths having a signal propagation delay;

determining a state of an input signal to a target signal input in a current root clock cycle using a check logic placed at the target signal input;

determining a target signal path from the plurality of signal paths in the current root clock cycle based on the state of the input signal to the target signal input in the current root clock cycle and one or more logic devices along each signal path associated with the target signal input; and determining the root clock frequency for the logic system design based on a longest signal propagation delay of the signal propagation delays of the plurality of signal paths excluding the target signal path;

controlling, according to the determined root clock frequency, an emulation process of the logic system design on the emulation system.

\* \* \* \* \*